United States Patent
Sasaki et al.

(10) Patent No.: US 7,787,335 B2
(45) Date of Patent: Aug. 31, 2010

(54) INFORMATION RECORDING DEVICE, INFORMATION RECORDING METHOD, AND INFORMATION RECORDING PROGRAM

(75) Inventors: Yoshio Sasaki, Saitama (JP); Hiroyuki Uchino, Saitama (JP); Kunihiko Horikawa, Saitama (JP)

(73) Assignee: Pioneer Corporation, Tokyo (JP)

( * ) Notice: Subject to any disclaimer, the term of this patent is extended or adjusted under 35 U.S.C. 154(b) by 252 days.

(21) Appl. No.: 10/594,795

(22) PCT Filed: Mar. 30, 2005

(86) PCT No.: PCT/JP2005/006083

§ 371 (c)(1),
(2), (4) Date: Sep. 29, 2006

(87) PCT Pub. No.: WO2005/096278

PCT Pub. Date: Oct. 13, 2005

(65) Prior Publication Data

US 2007/0230307 A1    Oct. 4, 2007

(30) Foreign Application Priority Data

Mar. 31, 2004    (JP) .............................. 2004-105788

(51) Int. Cl.
G11B 7/00    (2006.01)
(52) U.S. Cl. ................ 369/47.53; 369/59.12; 369/59.17
(58) Field of Classification Search ........................ None
See application file for complete search history.

(56) References Cited

U.S. PATENT DOCUMENTS 7,230,895 B2 *  6/2007  Sasaki et al. .............. 369/47.53
7,301,870 B2 * 11/2007  Masui ..................... 369/59.11

FOREIGN PATENT DOCUMENTS

| JP | 2000-030254 | 1/2000 |
| JP | 2003-077128 | 3/2003 |
| JP | 2003-085753 | 3/2003 |
| JP | 2004-213865 | 7/2004 |
| WO | WO 2004077418 A1 * | 9/2004 |

* cited by examiner

Primary Examiner—Jorge L Ortiz Criado
(74) Attorney, Agent, or Firm—Young & Thompson

(57) ABSTRACT

An information recording device, an information recording method, and an information recording program capable of recording information with an appropriate modulation degree, a high asymmetry, and small waveform distortion. The information recording device applies a laser beam to a recording medium such as a DVD-R/RW and DVD+R/RW and forms a recording mark corresponding to a recording signal, thereby recording information. A recording pulse signal for forming the recording mark corresponding to the recording signal has a mark period for forming the recording mark and a space period not forming the recording mark. In test recording performed prior to actual information recording, a long mark recording power is kept constant while a short mark recording power is changed. Preferably, the short mark recording power in the test write is changed so that the asymmetry and/or the beta value is a value within a desired range.

7 Claims, 13 Drawing Sheets

INFORMATION RECORDING DEVICE, INFORMATION RECORDING METHOD, AND INFORMATION RECORDING PROGRAM

TECHNICAL FIELD

The present invention relates to a technique of recording information onto an optical disc by using a laser light.

BACKGROUND TECHNIQUE

Onto a recordable or rewritable optical disc such as a DVD-R (DVD-Recordable) or a DVD-RW (DVD-Re-recordable), information is recorded thereon by irradiating a laser light on a recording surface of the disc. Since a temperature rises at a part on the recording surface of the optical disc to which the laser light is irradiated, a change occurs to an optical recording medium forming the optical disc, and thereby a recording mark is formed onto the recording surface.

Therefore, by modulating the laser light by using a recording pulse having a time width corresponding to information to be recorded, thereby to generate a laser pulse having a length corresponding to a signal to be recorded is generated, and by irradiating the generated laser pulse onto the optical disc, the recording mark having a length corresponding to the information to be recorded can be formed onto the optical disc.

Meanwhile, there is recently used such a control technique of a laser power that one recording mark is formed not by one laser pulse but by a pulse train unit having plural short pulses (also called "pulse train"). In addition, there is proposed a technique of using a recording pulse waveform having a top pulse period, a last pulse period and an intermediate bias period therebetween, instead of a recording pulse waveform having the pulse train, at the time of high-speed recording (see Japanese Patent Applications Laid-open under No. 2003-77128 and No. 2003-85753, for example).

In the above-mentioned recording systems, the laser power in the pulse train period, the top pulse period and the last pulse period has a fixed value irrespective of a mark length. For example, in a write strategy for 8-times high speed recording of a DVD-R, 3T and 4T marks are recorded by a single recording pulse, and a mark equal to or larger than 5T is recorded by the recording pulse waveform having the top pulse period, the last pulse period and the intermediate bias period, as describe above. However, levels thereof, i.e., recording powers, are same.

On the other hand, in a system of 4-times high speed recording of a DVD+R, marks of all lengths are formed by a single recording pulse. However, the levels (i.e., the recording powers) of the 3T and 4T recording pulses become larger than the level of the mark equal to or larger than 5T. Concretely, a ratio of the recording powers of the 3T mark, the 4T mark and the mark equal to or larger than 5T is determined to be constant.

When the recording is performed by the recording pulse waveform having the recording power of one kind or the recording power of the fixed ratio, as recording speed is high, a modulation degree becomes large. But when the modulation degree becomes large, such probability that an adverse effect is given to an AR (Aperture Ratio), an LPP error, an ADIP error becomes large. In addition, asymmetry at which thermal interference occurs becomes close to a lower limit of a standard value or a range enabling reproduction, and a margin thereof becomes narrow.

DISCLOSURE OF INVENTION

The present invention has been achieved in order to solve the above problems. It is an object of this invention to provide an information recording apparatus, an information recording method and an information recording program capable of recording information with an appropriate modulation degree, high asymmetry and little waveform distortion even at the time of high-speed recording.

According to one aspect of the present invention, there is provided an information recording apparatus which irradiates a laser light onto a recording medium and forms a recording mark corresponding to a recording signal, including: a light source which emits the laser light; a signal generating unit which generates a recording pulse signal for driving the light source based on the recording signal; and a test writing unit which drives the light source based on the recording pulse signal and executes test writing, wherein the recording pulse signal includes a mark period for forming the recording mark and a space period for forming no recording mark, and wherein the test writing unit executes the test writing with making a recording power of a long mark constant and varying a recording power of a short mark.

The above information recording apparatus irradiates the laser light to the recording medium such as DVD-R/RW and DVD+R/RW and forms the recording mark corresponding to the recording signal to record the information. The recording pulse signal for forming the recording mark corresponding to the recording signal includes the mark period for forming the recording mark and the space period for forming no recording mark. In the test writing (test recording) executed before the actual information recording, the recording power of the long mark is made constant, and the recording power of the short mark is varied. Thereby, the recording power of the short mark is appropriately determined in order to obtain a desired recording characteristic. In addition, by using the recording power thus determined, the actual recording is performed.

In a manner of the above information recording apparatus, the recording power of the long mark may be a recording power ensuring reproduction compatibility. In an embodiment particularly preferred in this case, the recording power of the long mark may be a recording power making a modulation degree within a predetermined range.

In another manner of the above information recording apparatus, the recording power of the long mark may be a recording power making waveform distortion equal to or smaller than a predetermined value.

In another manner of the above information recording apparatus, the recording power of the short mark may be a recording power making asymmetry within a range of −0.05 to 0.15. Additionally, in another manner, the recording power of the short mark may be a recording power making a β value of 0.

In another manner of the above information recording apparatus, the test writing unit may read a recording mark formed by the test writing, and may repeat the test writing until asymmetry and/or a β value obtained based on the read recording mark satisfies a predetermined condition. Thereby, the appropriate recording power satisfying the predetermined condition can be obtained.

In a preferred embodiment of the above information recording apparatus, the short mark may be a shortest mark and the long mark may be a mark other than the short mark. In another preferred embodiment, the short mark may be a shortest mark and a second shortest mark, and the long mark may be a mark other than the short mark. In still another preferred embodiment, the short mark may be a mark which does not have a level of largest magnitude, and the long mark may be a mark which has a level of largest magnitude.

According to another aspect of the present invention, there is provided an information recording method which irradiates a laser light onto a recording medium and forms a recording mark corresponding to a recording signal, including: a signal generation process which generates a recording pulse signal for driving a light source based on the recording signal; and a test writing process which drives the light source based on the recording pulse signal and executes test writing, wherein the recording pulse signal includes a mark period for forming the recording mark and a space period for forming no recording mark, and wherein the test writing process executes test writing with making a recording power of a long mark constant and varying a recording power of a short mark.

In accordance with the above information recording method, the appropriate recording power realizing desired asymmetry and/or β value can be determined, similarly to the above information recording apparatus.

According to still another aspect of the present invention, there is provided an information recording program executed in an information recording apparatus which includes a light source and irradiates a laser light onto a recording medium to form a recording mark corresponding to a recording signal, and the program making the information recording apparatus execute: a signal generating process which generates a recording pulse signal for driving the light source based on the recording signal; and a test writing process which drives the light source based on the recording pulse signal and executes test writing, wherein the recording pulse signal includes a mark period for forming the recording mark and a space period for forming no recording mark, and wherein the test writing process executes test writing with making a recording power of a long mark constant and varying a recording power of a short mark.

By executing the above information recording program in the information recording apparatus, the above information recording apparatus can be realized.

BRIEF DESCRIPTION OF THE REFERENCE NUMBER

Figure 1:
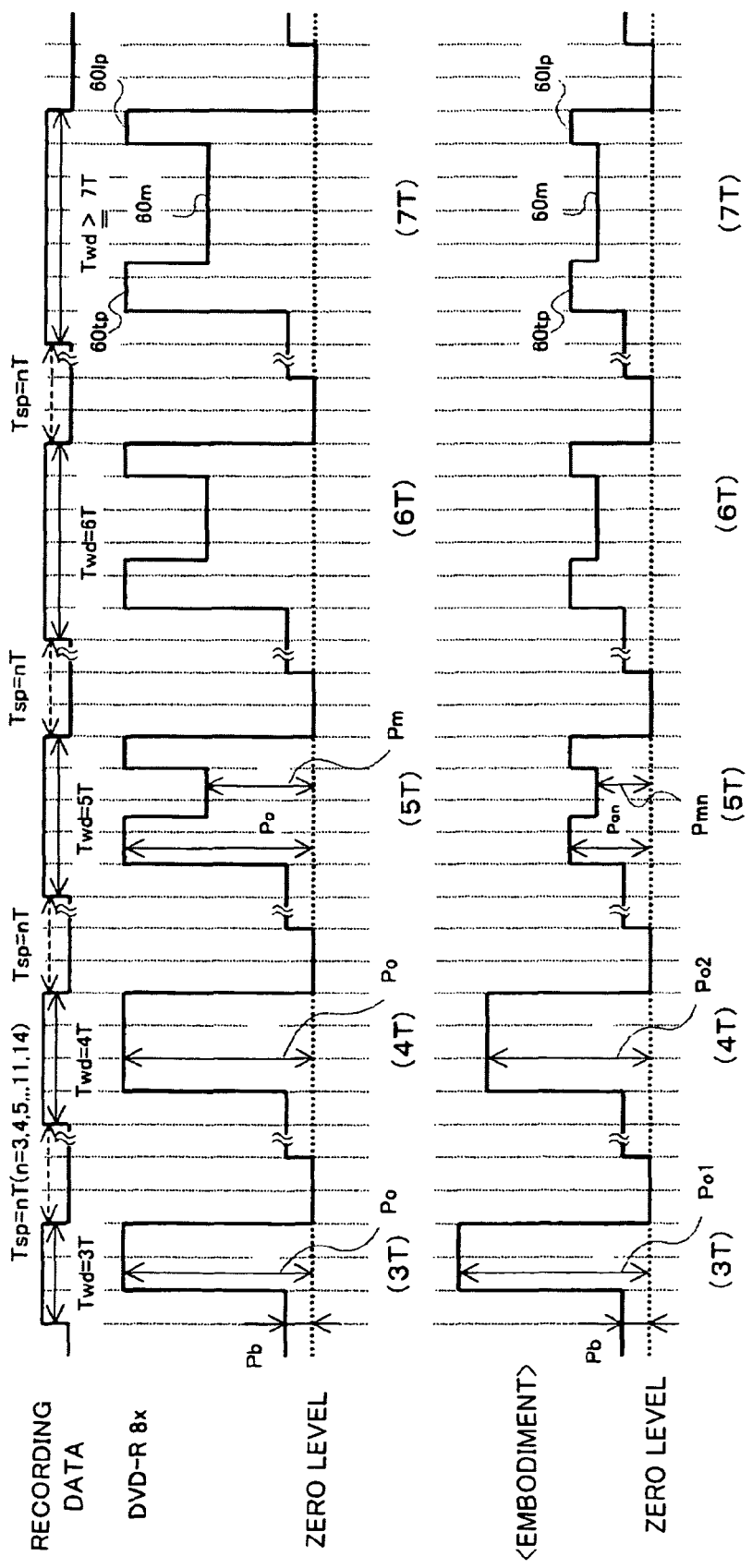
FIG. 1 is a diagram showing a recording pulse waveform according to a first embodiment of the present invention.

1 Information recording and reproduction apparatus
2 Optical pickup
3 Spindle motor
10 Recording control unit
12 LD driver
13 APC circuit
14 Sample-holding circuit
15 Controller
16 Front monitor diode
20 Reproduction control unit
30 Servo control unit

DETAILED DESCRIPTION OF THE PREFERRED EMBODIMENTS

In this invention, the recording powers of the long mark and the short mark are separately set in the information recording apparatus which drives a laser light source by the recording pulse signal to record the information. By performing the test writing with fixing the recording power of the long mark and varying the recording power of the short mark, an optimum recording power of the short mark is determined.

First Embodiment

First, a description will be given of a first embodiment of the present invention. In an explanation below, before an embodiment of performing the test writing, the recording powers of the short mark and the long mark will be explained.

FIG. 1 shows a recording pulse waveform (write strategy) according to a first embodiment of the present invention. For the purpose of comparison, the recording pulse waveform at the time of 8-times high speed recording of a normal DVD-R is shown at an upper part in FIG. 1, and the recording pulse waveform according to the first embodiment is shown at a lower part in FIG. 1.

In FIG. 1, the recording data includes a mark period Twd having a length corresponding to a recording data length and a space period Tsp having the length corresponding to the recording data length. In the present invention, since the length of the space period does not matter, a part thereof is omitted from the illustration in FIG. 1.

On the DVD-R, the marks of the lengths of 3T and 4T are formed by the recording pulse waveform having the single pulse, and the mark of the length equal to or larger than 5T is formed by the recording pulse waveform formed into a substantially concave (凹) shape and having a top pulse 60 tp, a last pulse 60 lp and an intermediate bias portion 60 m. Concretely, as shown at the upper part in FIG. 1, at the time of the 8-times high speed recording of the DVD-R, the recording pulse waveforms of 3T and 4T have a period of a bias power Pb, a period of a peak power Po and a period of a zero level. In addition, the recording pulse waveform equal to or larger than 5T has a period of the bias power Pb, the top pulse period 60 tp and the last pulse period 60 lp of the peak power Po, the period 60 m of the intermediate bias power Pm, and the zero level period. As shown in FIG. 1, in the recording pulse waveform at the time of the 8-times high speed recording of the normal DVD-R, the powers of the 3T and 4T marks and the power of the portions of the top pulse and the last pulse of the mark equal to or larger than 5T, which are referred to as "peak powers Po", become same.

In this specification, "recording power" is a concept including the peak power and the intermediate bias power. Namely, when the recording pulse waveform is the mark of 3T and 4T shown in FIG. 1, the recording power is only the peak power. Meanwhile, when the recording pulse waveform is the mark equal to or larger than 5T, the recording power indicates the peak power and the intermediate bias power.

On the other hand, in the present invention, the recording powers of the long mark and the short mark are made different from each other. In the first embodiment, it is defined that "short mark" indicates the shortest mark and the second shortest mark, and "long mark" indicates the mark other than the short mark. Namely, the short mark is the mark of 3T and 4T, and the long mark is the mark equal to or larger than 5T.

Namely, as shown at the lower part in FIG. 1, a peak power Po1 of the recording pulse waveform of the 3T mark and a peak power Po2 of the recording pulse waveform of the 4T mark are different from a peak power Pon of the recording pulse waveform of the mark equal to or larger than 5T. The peak power Pon of any mark equal to or larger than 5T is same.

In FIG. 1, the peak power Po1 of the 3T mark is larger than the peak power Po2 of the 4T mark. However, this is only an example, and the present invention is not limited to this. Thus, the peak power Po1 of the 3T mark and the peak power Po2 of the 4T mark may be same, and one of them may be larger than the other. However, in any case, the peak power Po1 of the 3T mark and the peak power Po2 of the 4T mark are different from the peak power Pon of the mark equal to or larger than 5T.

Next, a description will be given of a determination method of the recording powers of the short mark and the long mark. In this embodiment, the recording power is determined in consideration of the modulation degree, the asymmetry, the waveform distortion and the β value as an evaluation parameter of the recording state.

Figure 2:
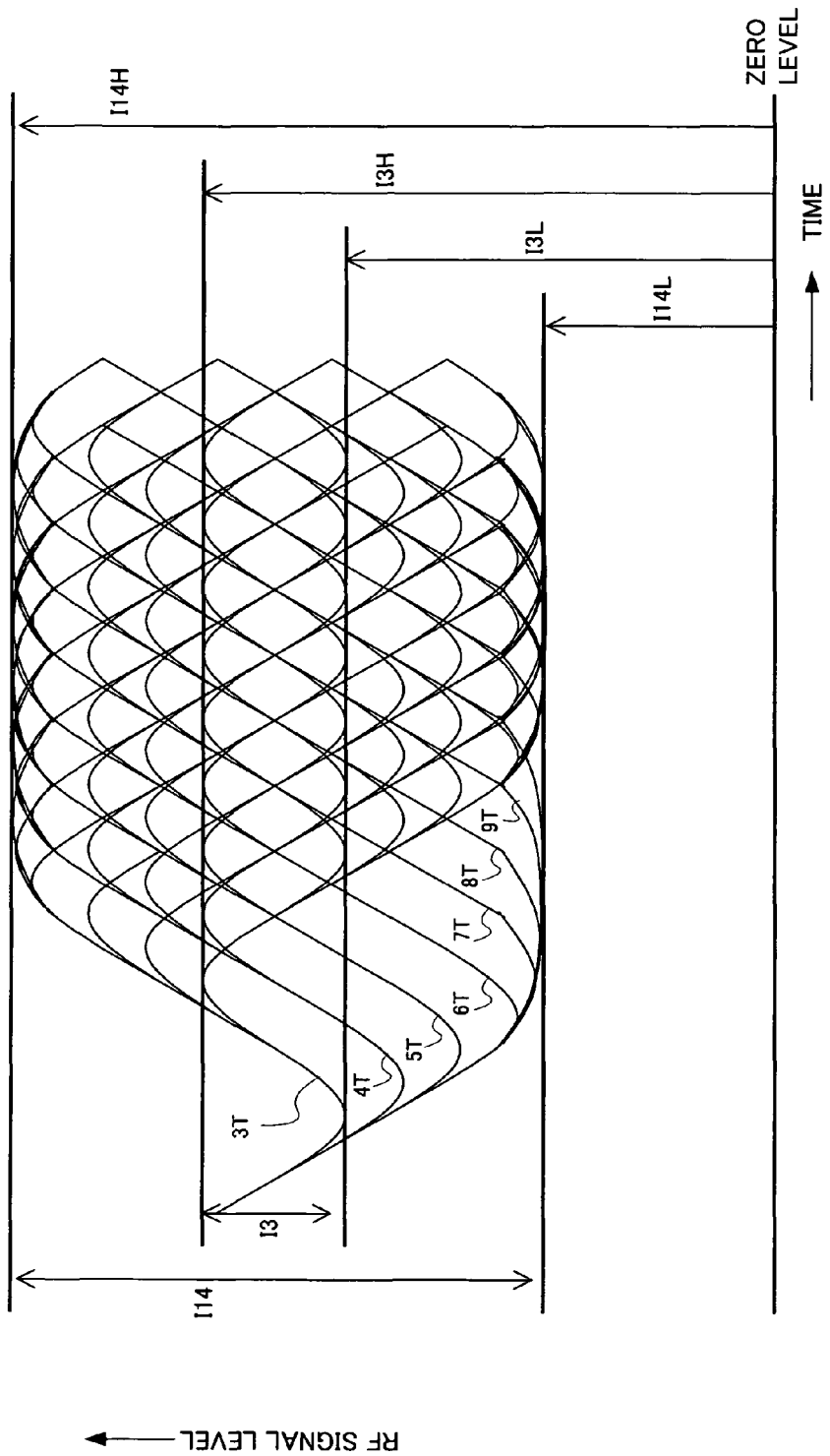
FIG. 2 is a diagram explaining a modulation degree and asymmetry.

FIG. 2 conceptually shows the modulation degree and the asymmetry. "Modulation degree" is a ratio of magnitude of an RF signal (an RF signal obtained by photo-electronically converting the returned light from the recording medium and including a DC component) obtained by reading the data recorded on the recording medium with respect to a difference between the zero level and the peak level of the RF signal. FIG. 2 shows an example of the RF signal waveform obtained by reproducing the recording medium. Namely, the modulation degree is the ratio of an RF signal magnitude I14 with respect to a difference I14H between the zero level and the peak level, which is given by an equation below.

$$\text{Modulation Degree} = I14/I14H \qquad (1)$$

Generally, when forming of the recording mark on the recording medium is insufficient, the modulation degree becomes low, and a noise influence to a reproduction signal becomes large. Thus, an S/N ratio decreases, and an adverse effect occurs to the reproduction compatibility. "Having the reproduction compatibility" means that the recording medium recorded by a certain recording apparatus can be appropriately reproduced by a different reproduction apparatus.

"Asymmetry" is a position of the shortest mark with respect to a predetermined long mark, giving the largest magnitude in the RF signal reproduced from the recording medium, and it is concretely given by an equation below.

$$\text{Asymmetry} = \{(I14H+I14L)/2 - (I3H+I3L)/2\}/I14 \qquad (2)$$

Namely, as shown in FIG. 2, it shows a positional relation between the intermediate level of the levels I14H and I14L of the RF signal corresponding to the predetermined long mark (14T mark) and the intermediate level of the levels I3H and I3L of the RF signal corresponding to the shortest mark.

Figure 3:
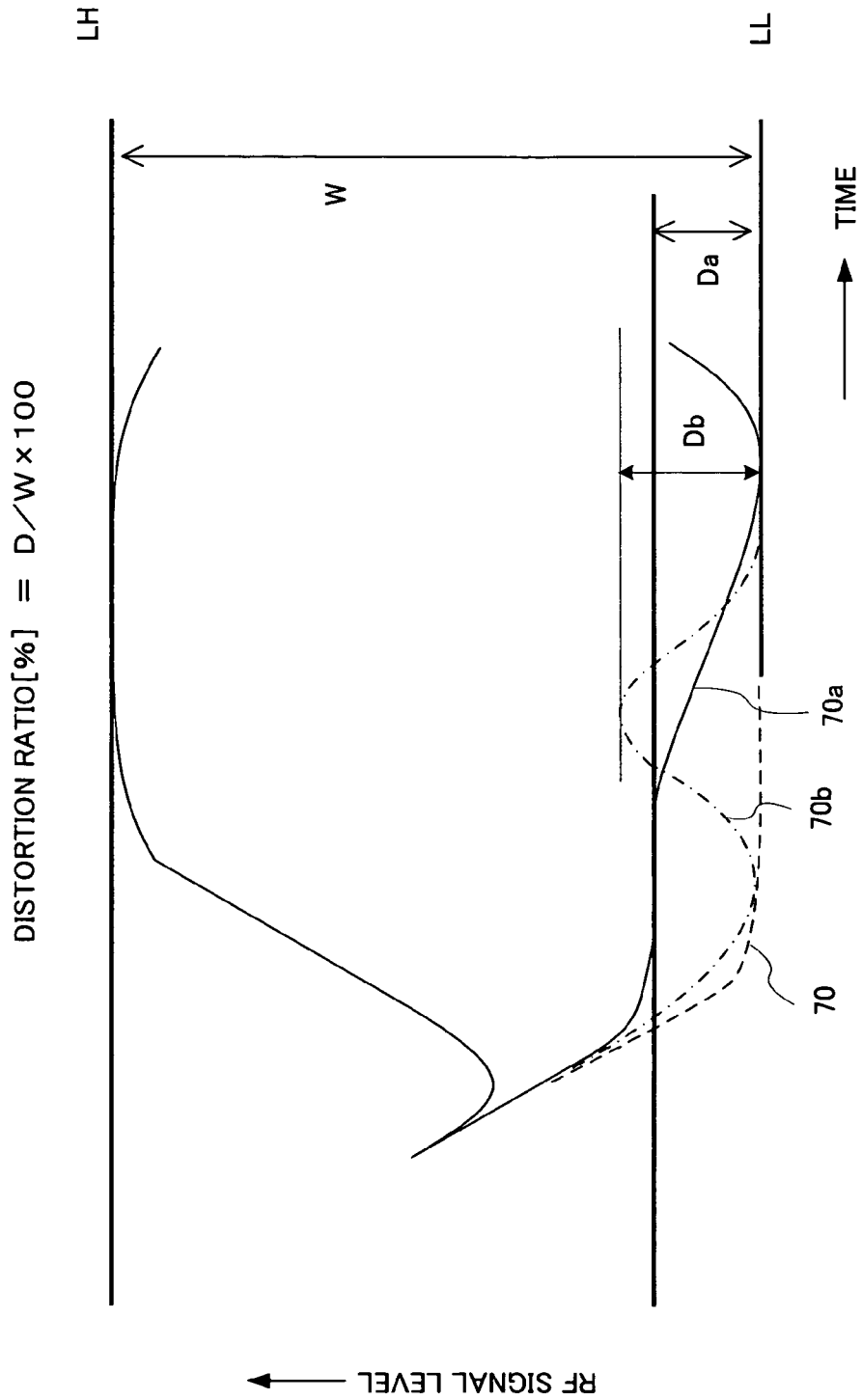
FIG. 3 is a diagram explaining a definition of waveform distortion (distortion ratio)

FIG. 3 schematically shows a definition of the waveform distortion (distortion ratio). In FIG. 3, the waveform distortion is a ratio of distortion amount D with respect to magnitude W of the RF signal. The distortion amount indicates a difference between an original level LL and the level actually appearing in the RF signal waveform. In FIG. 3, a broken-line graph 70 is the RF signal waveform having no distortion, and the distortion amount is "0". A graph 70a is an example of the RF signal waveform having the distortion, and the distortion amount is Da. In addition, a graph 70b is another example of the RF signal waveform having the distortion, and the distortion amount is Db. As shown by the graphs 70a and 70b, the waveform distortion can be a difference between the original level LL and a level at which the RF signal waveform temporarily becomes substantially flat (i.e., substantially zero inclination).

In addition, although FIG. 3 shows such an example that the distortion occurs to a side of a bottom level of the RF signal waveform, the distortion can sometimes occur to the side of the peak level of the RF signal waveform. The distortion ratio in this embodiment includes both cases.

Figure 6:
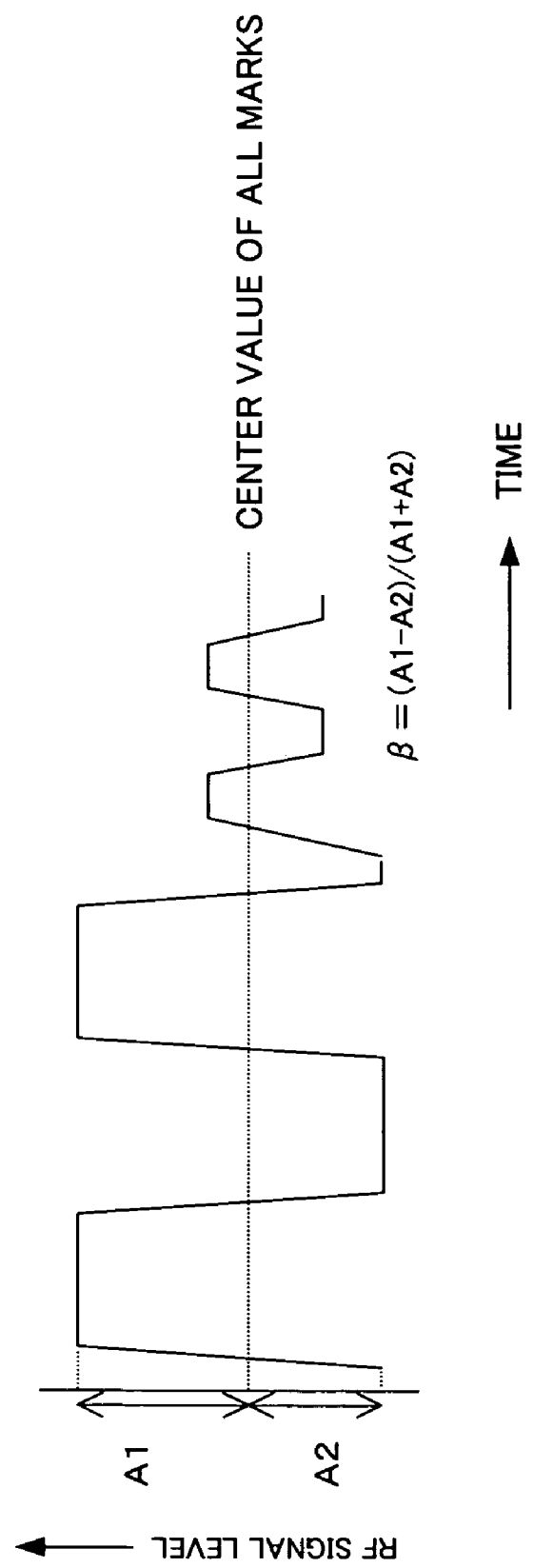
FIG. 6 is a diagram schematically showing a definition of a β value.

FIG. 6 schematically shows a definition of the β value. The β value is a parameter showing shift amount between an average level of the RF signal and a center value (center value of all marks) of the magnitude level of the RF signal. The average level of the RF signal can be obtained by making the RF signal pass through an LPF, for example. In addition, the center value of the magnitude level of the RF signal can be obtained by calculation based on the smallest level and the largest level of the RF signal corresponding to the reproduced recording data. The β value as close to "0" as possible is preferred. Namely, it is preferred that the shift between the average level of the RF signal and the center value of the magnitude level of the RF signal is as small as possible.

Figure 4:
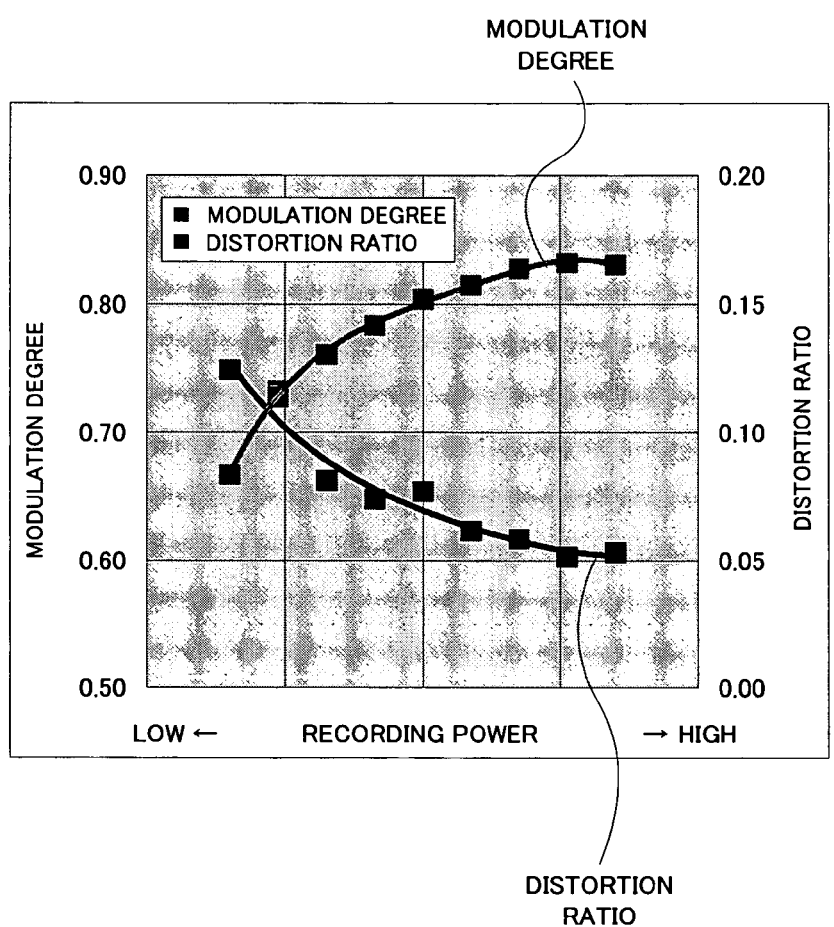
FIG. 4 is a graph showing a relation of a recording power, the modulation degree and the distortion ratio.

Next, a description will be given of the determination method of the recording powers of the long mark and the short mark. First, the recording power of the long mark will be explained. In this embodiment, the recording power of the long mark is determined to be one of the followings:

(Condition-A) recording power within a range capable of ensuring reproduction compatibility (Condition-B) recording power by which the waveform distortion does not occur or does become equal to or smaller than the predetermined value (Condition-C) recording power satisfying both of Condition-A and Condition-B First, the Condition-A relating to the reproduction compatibility will be explained. FIG. 4 shows the relation of the recording power, the modulation degree and the distortion ratio. As shown in FIG. 4, as the recording power increases, the modulation degree becomes large. But the increase is saturated at the recording power of a certain extent. According to a DVD standard, the modulation degree equal to or larger than 60% is required in order to ensure the reproduction compatibility, and the upper limit is not defined.

However, as the modulation degree becomes large, such probability that an adverse effect is given to an LPP error ratio and an AR in a case of the DVD-R and an ADIP error ratio in a case of the DVD+R becomes large. The AR indicates a numerical aperture of the LPP detecting waveform in the DVD-R, and it is an index whether or not the LPP can be appropriately detected. The LPP error ratio shows the error ratio of the LPP signal in the reproduction RF signal. As described above, though the modulation degree is preferably equal to or larger than 60% in order to ensure the reproduction compatibility, if the modulation degree becomes too large, a width of a pit formed on a groove of the recording medium becomes large. Thereby, it sometimes occurs that the LPP formed adjacently to the groove cannot be read. Thus, the AR and the LPP error ratio are deteriorated. In addition, in the case of the DVD+R, if the modulation degree becomes too large, the formed pit becomes too large, and a pre-address prerecorded on the disc cannot be read. Thereby, the ADIP error ratio becomes deteriorated.

Additionally, if the modulation degree is large, a thermal influence to the other mark adjacently arranged, particularly to the short mark, increases, and deterioration of the recording characteristic occurs due to the thermal interference. Further, as shown in FIG. 4, since variation amount of the modulation degree with respect to the variation of the recording power becomes small, when the modulation degree is used for the detection of the characteristic, e.g., ROPC (Running Optimum Power Control), detection accuracy decreases.

As described above, if the modulation degree is too large, various kinds of problems can occur. Therefore, it is preferable that the modulation degree is made as small as possible within the range capable of ensuring the reproduction compatibility, e.g., substantially "0.6" (60%). Additionally, in view of preventing the above-mentioned various kinds of problems, it is preferable that the upper limit of the modulation degree is set to substantially "0.8" (80%) in FIG. 4. Therefore, it is preferable that the peak power Pon of the long mark is set within the range capable of ensuring the reproduction compatibility. Concretely, it is preferable that the modulation degree is within the range of substantially 0.6 to 0.8. Particularly, the modulation degree is preferably set to substantially 0.6.

Next, a description will be given of the Condition-B relating to the waveform distortion (distortion ratio). Although the waveform distortion is different dependently on the recording condition and the recording medium, in the example in FIG. 4, as the recording power decreases, the distortion ratio increases. As the distortion ratio becomes large, the recording characteristic becomes deteriorated. Thus, the peak power Pon of the long mark is preferably determined so that the waveform distortion does not occur or does sufficiently become small (e.g., equal to or smaller than 10%). The graph of the distortion ratio shown in FIG. 4 is only an example. Hence, dependently on the recording condition and the recording medium, there can be a case showing such a characteristic that, as the recording power increases, the distortion ratio increases.

In this manner, as shown in the Condition-C, the recording power of the long mark is most preferably determined so that the Condition-A relating to the reproduction compatibility and the Condition-B relating to the waveform distortion are simultaneously satisfied.

Figure 5A:
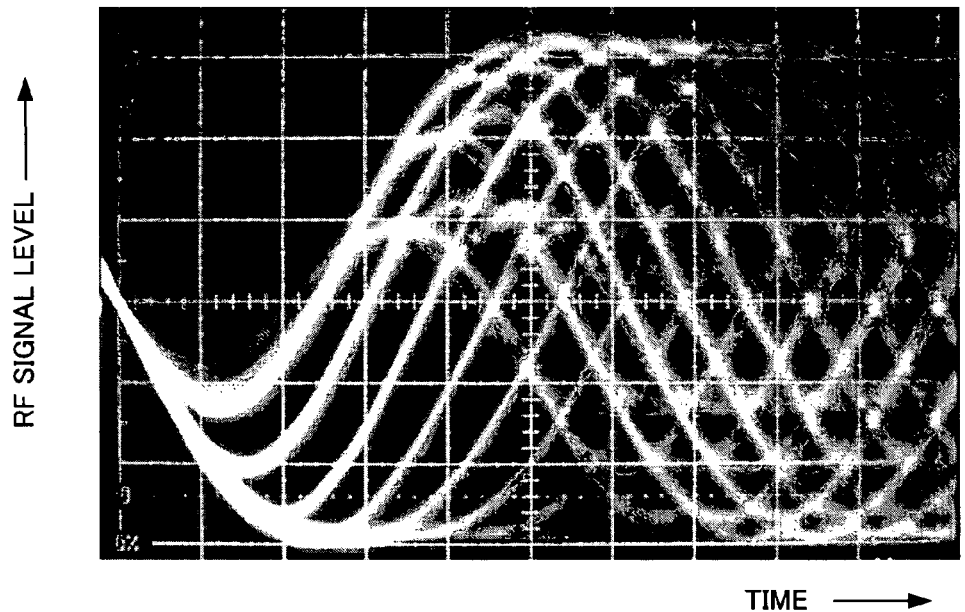
FIGS. 5A and 5B show waveform examples of reproduction RF signals of data recorded by a normal recording method and by a recording method of the embodiment.
Figure 5B:
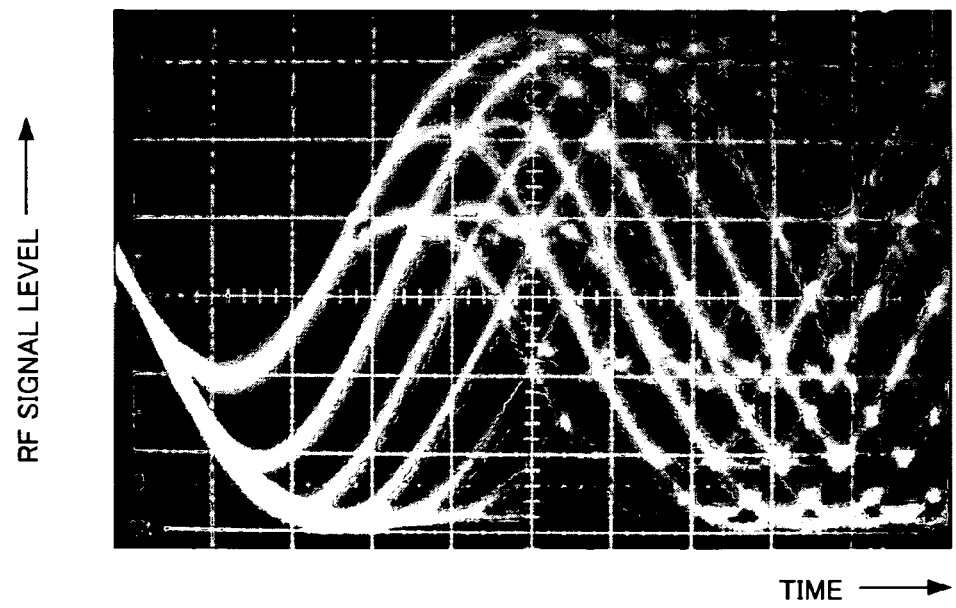

Next, a description will be given of the determination method of the recording power of the short mark. FIGS. 5A and 5B show waveform diagrams to compare the influences of the thermal interferences by the normal method and by this embodiment. FIG. 5A is by the normal method, which is the reproduction RF signal waveform in such a case that the marks of all the lengths are formed by the same recording power, as shown at the upper part in FIG. 1. Meanwhile, as shown at the lower part in FIG. 1, FIG. 5B is the reproduction RF signal waveform in such a case that the short mark (3T and 4T) and the long mark (equal to or larger than 5T) are formed by the different recording power. In both cases, the asymmetry is within the appropriate range.

As shown in FIG. 5A, the level of the waveform of the 3T mark varies due to the influence of the thermal interference, and the waveform like a barbel occurs. Thereby, though the asymmetry is within the appropriate range, the recording characteristic (jitter) becomes deteriorated.

Meanwhile, as shown in FIG. 5B, in this embodiment, no influence of the thermal interference occurs to the waveform of the 3T mark. By making the recording powers of the short mark and the long mark different to record them, the power at the time of the recording of the long mark reduces the thermal influence given to the short mark, as compared with the normal case of the recording of all the marks with using the same recording power. Thus, the short mark can be recorded within the range in which no thermal interference occurs. Namely, like this embodiment, it is preferable that the recording power of the short mark is made different from the recording power of the long mark and the peak powers Po1 and Po2 being the short marks are determined within a range in which the appropriate asymmetry (e.g., −0.05 to 0.15 according to the DVD standard) can be obtained.

In addition, as the parameter for determining the appropriate recording power of the short mark, the above-mentioned β value can be used. In this case, the recording power of the short mark is preferably determined so that the β value becomes the value within the predetermined range close to "0".

Next, a description will be given of the test writing according to the first embodiment. In the present invention, with fixing the recording power of the long mark, i.e., the peak power and the intermediate bias power, and with varying the recording power of the short mark, the test writing (test recording) is performed so that a more preferred recording condition is determined for each recording medium. Thereby, the optimum recording power of the short mark is determined. The parameter used at the time of determining of the recording power of the short mark is at least the symmetry or the β value, as described above.

Figure 7:
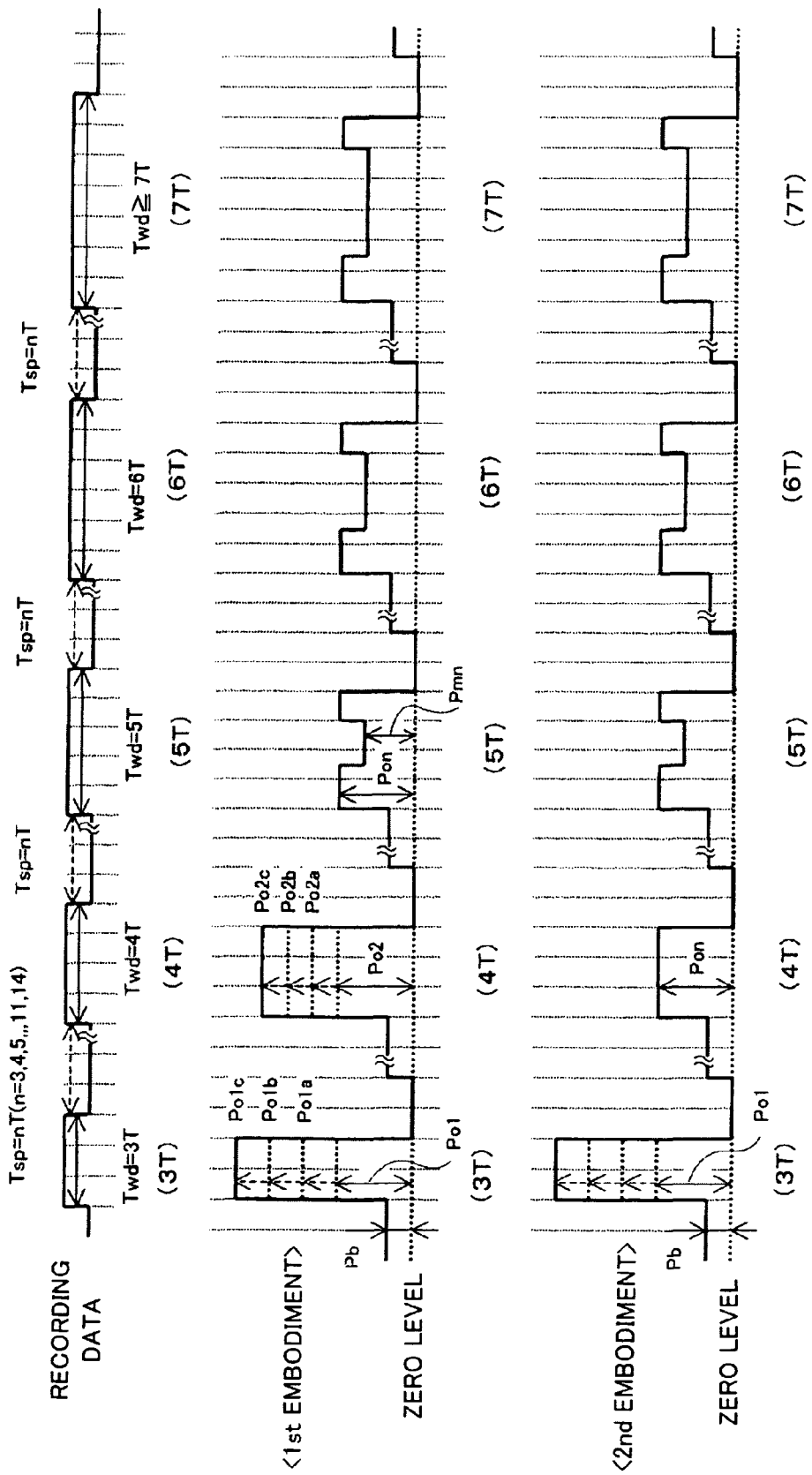
FIG. 7 is a diagram showing the recording pulse waveform according to a second embodiment.

A state of the test writing according to the first embodiment is schematically shown at an upper part of FIG. 7. In the first embodiment, as described above, the shortest mark (3T mark) and the second shortest mark (4T mark) are defined as the short marks, and the mark other than the short marks is defined as the long mark. Thus, in the test writing, the recording power of the mark equal to or larger than 5T, i.e., the peak power Pon and the intermediate bias power Pmn, is set to a constant value, as shown in FIG. 7.

The peak power Pon and the intermediate bias power Pm of the long mark used for the test writing are predetermined separately from the recording power of the short mark by various kinds of known methods, and they are stored in a controller which will be described later, for example.

As shown in FIG. 7, in the test writing, the recording power of the short mark, i.e., the 3T mark and the 4T mark, is gradually varied. In the example shown in FIG. 7, the peak power Po1 of the 3T mark is started from Pon and gradually increased. Similarly, the peak power Po2 of the 4T mark is also started from Pon and gradually increased. In this manner, the recording power of the short mark is gradually varied from a predetermined initial value, and the test writing is performed on the recording medium.

Then, the test-written recording data is read, and the parameter such as the asymmetry and the β value is calculated and evaluated. The test writing is repeatedly performed until the parameter such as the asymmetry and the β value obtained by reproducing the test-written data satisfies the predetermined condition. Thereby, the optimum recording power (peak powers Po1 and Po2) of the short mark is determined.

Concretely, in the example of FIG. 7, in the first test writing, the test writing is performed by defining the peak powers of the 3T mark, the 4T mark and the mark equal to or larger than 5T mark as Po1 (=Pon), Po2 (=Pon) and Pon, respectively. In addition, in the second test writing, the test writing is performed by defining the peak powers of the 3T mark, the 4T mark and the mark equal to or larger than 5T mark as Po1$a$, Po2$a$ and Pon, respectively. Further, in the third test writing, the test writing is performed by defining the peak powers of the 3T mark, the 4T mark and the mark equal to or larger than 5T mark as Po1$b$, Po2$b$ and Pon, respectively. In this manner, the test writing is repeatedly performed until the recording power satisfying the predetermined condition is obtained.

In the example of FIG. 7, though the power value for starting the test writing of the short mark coincides with the determined peak power Pon of the long mark, the application of the present invention is not limited to this. Namely, the test writing of the short mark may be started from a value smaller than the peak power Pon of the long mark.

Additionally, in the example of FIG. 7, the recording power of the short mark is gradually increased in the test writing of plural times. Conversely, the recording power may be gradually decreased from the predetermined initial power value.

The recording data used for the test writing is as follows. First, a random pattern including the same data as that used at the actual recording time can be used as the recording data for the test writing. By using the random pattern, the asymmetry and the β value can be obtained as the evaluation parameter for the test writing.

In addition, the actual data including a data address can be used as the recording data for the test writing. In this case, similarly to the above case, it is advantageous that the asymmetry and the β value can be obtained and an error rate of the data can be further obtained.

Additionally, in the patterns included in the data, a specific pattern in which detection sensitivity of the value relating to the evaluation parameter for the test writing increases can be also used as the recording data for the test writing. As an example of the specific pattern, there is a pattern formed by repetition of the shortest mark/space (3T mark/3T space) and the mark/space (e.g., 11T mark/11T space) giving the largest magnitude. Thereby, as compared with such a case that the above-mentioned random pattern and the actual data are used, the detection sensitivity of the asymmetry and the β value can be improved.

Second Embodiment

Next, a description will be given of a second embodiment of the present invention. The second embodiment is different from the first embodiment only in the definition method of the long mark and the short mark. The recording pulse waveform according to the second embodiment is shown at a lower part of FIG. 7. As shown, in the first embodiment, the shortest mark (3T) and the second shortest mark (4T) are defined as the short marks, and the mark (equal to or larger than 5T) other than the short marks is defined as the long mark. Then, with fixing the recording power of the long mark and varying the peak powers Po1 and Po2 of the short mark, the test writing is performed.

Meanwhile, in the second embodiment, only the shortest mark (3T) is defined as the short mark, and the mark (equal to or larger than 4T) other than the short mark is defined as the long mark. Therefore, as shown, with fixing the peak power Pon and the intermediate bias power Pm of the mark equal to or larger than 4T being the long mark and varying the peak power Po1 of the 3T mark being the short mark, the test writing is performed.

The determination method of the recording power of the short mark by the test writing is same as that of the first embodiment. Namely, the peak power Po1 of the short mark is determined so that the asymmetry and/or the β value is within the appropriate range.

Third Embodiment

Figure 8:
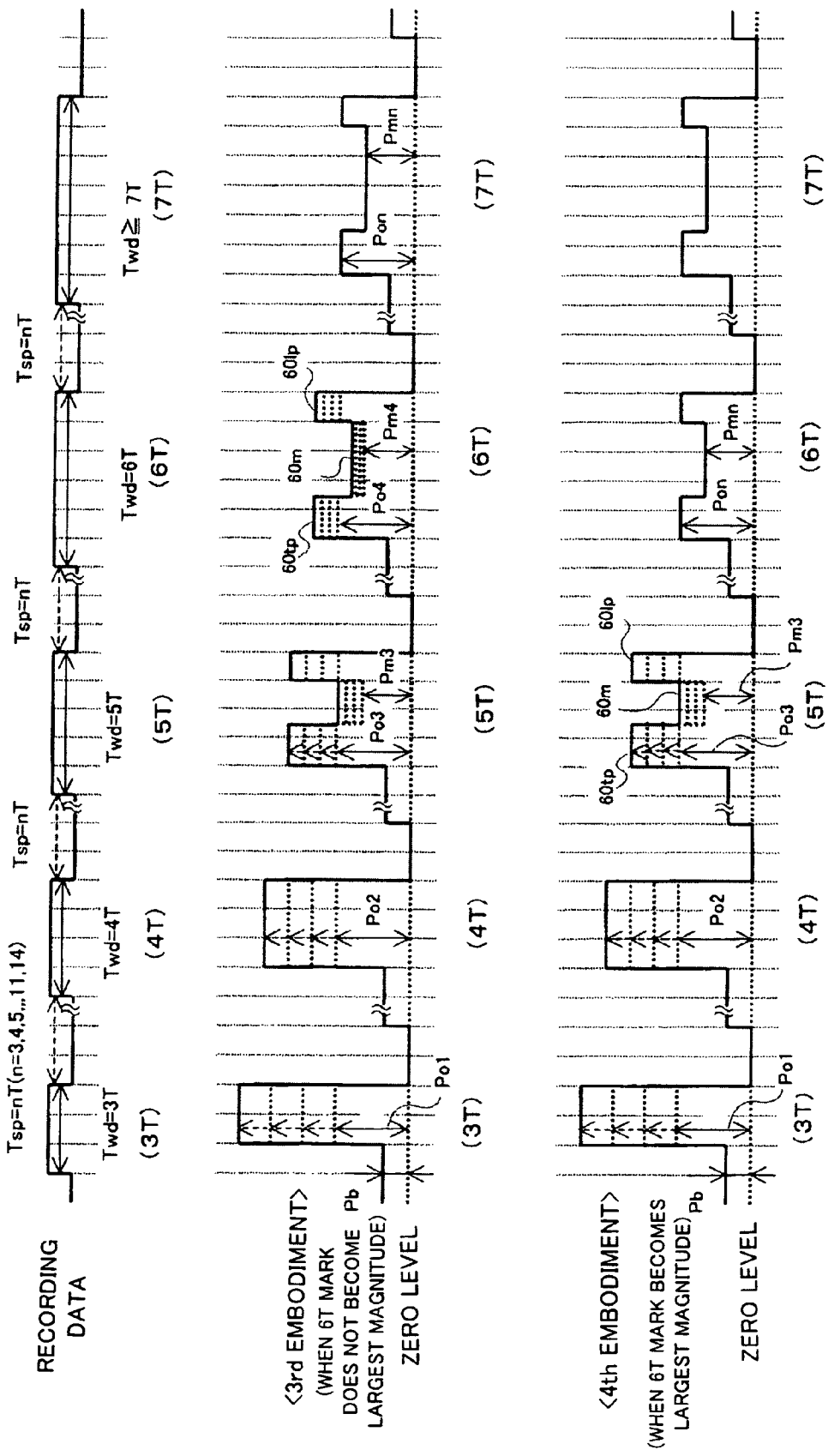
FIG. 8 is a diagram showing the recording pulse waveform according to a third embodiment.

Next, a third embodiment will be explained. The third embodiment is also different from the first embodiment only in the definition method of the long mark and the short mark. FIG. 8 shows the recording pulse waveform diagram in the third embodiment. The recording pulse waveform in such a case that a 6T mark does not become the largest magnitude is shown at an upper part of FIG. 8, and the recording pulse waveform in such a case that the 6T mark becomes the largest magnitude is shown at a lower part of FIG. 8.

In the third embodiment, it is defined that the mark whose RF signal waveform does not become the largest magnitude is the short mark and the mark whose RF signal waveform becomes the largest magnitude is the long mark. However, whether or not a certain mark becomes the largest magnitude may change dependently on the recording condition and the recording medium. Normally, the marks of 3T to 5T do not become the largest magnitude, and the mark equal to or larger than 7T becomes the largest magnitude. But the mark of 6T sometimes becomes and sometimes does not become the largest magnitude. Thus, when the mark of 6T does not become the largest magnitude, the marks of 3T to 6T are defined as the short marks, and the mark equal to or larger than 7T is defined as the long mark (see the upper part of FIG. 7). Meanwhile, when the mark of 6T becomes the largest magnitude, the marks of 3T to 5T are defined as the short marks, and the mark equal to or larger than 6T is defined as the long mark.

Concretely, as shown at an upper part of FIG. 8, when the 6T mark does not become the largest magnitude, the mark being no largest magnitude, i.e., 3T to 6T marks, is defined as the short mark, and the mark (equal to or larger than 7T) other than the short mark is defined as the long mark. Therefore, as shown in FIG. 8, the peak power Pon and the intermediate bias power Pmn of the mark equal to or larger than 7T being the long mark are fixed. Then, as for the 3T to 6T marks being the short marks, the peak powers Po1 to Po4 of the top pulse 60tp and the last pulse 60lp are varied, and the test writing is performed. In addition, as shown in FIG. 8, as for the 5T and 6T marks, powers Pm3 and Pm4 of the intermediate bias portion 60m are simultaneously varied, and the test writing is performed.

On the other hand, as shown at a lower part of FIG. 8, when the 6T mark becomes the largest magnitude, the mark being no largest magnitude, i.e., the 3T to 5T marks, is defined as the short mark, and the mark (equal to or larger than 6T) other than the short mark is defined as the long mark. Therefore, as shown, the peak power Pon and the intermediate bias power Pmn of the mark equal to or larger than 6T being the long mark are fixed. Then, as for the 3T to 5T marks being the short marks, the peak powers Po1 to Po5 of the top pulse 60tp and the last pulse 60lp are varied, and the test writing is performed. In addition, as shown, as for the 5T mark, the power Pm3 of the intermediate bias portion 60m is also simultaneously varied, and the test writing is performed.

The determination method of the recording power of the short mark by the test writing is same as that of the first embodiment. Namely, the peak powers Po1 to Po4 and the intermediate bias powers Pm3 and Pm4 of the short mark are determined so that the asymmetry and/or the β value is within the appropriate range.

Embodiment of Information Recording and Reproduction Apparatus

Figure 9:
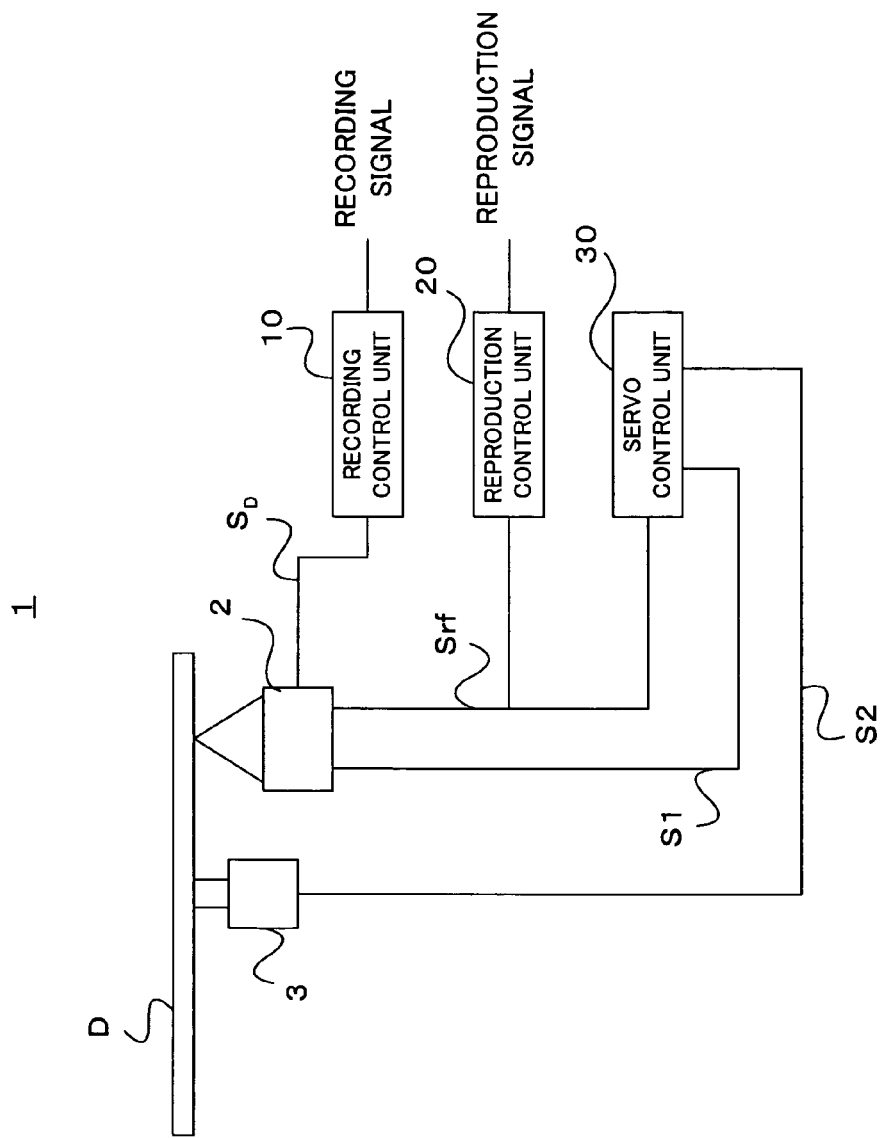
FIG. 9 is a block diagram schematically showing a configuration of an information recording and reproduction apparatus to which the present invention is applied.

FIG. 9 schematically shows the entire configuration of an information recording and reproduction apparatus to which the present invention is applied. An information recording and reproduction apparatus 1 records information onto an optical disc D and reproduces the information from the optical disc D. Various kinds of optical discs such as DVD-R/RW and DVD+R/RW are usable as the optical disc D.

The information recording and reproduction apparatus 1 includes an optical pickup 2 for irradiating a recording beam and a reproduction beam onto the optical disc D, a spindle motor 3 for controlling rotation of the optical disc D, a recording control unit 10 for controlling the recording of the information onto the optical disc D, a reproduction control unit 20 for controlling the reproduction of the information recorded on the optical disc D, and a servo control unit 30 for executing various kinds of servo control including a spindle servo controlling rotation of the spindle motor 3, a focus servo and a tracking servo being a relative position control to the optical disc D of the optical pickup 2.

The recording control unit 10 receives a recording signal and generates a driving signal SD for driving a laser diode in the optical pickup 2 by a process, which will be explained later, to supply it to the optical pickup 2.

The reproduction control unit 20 receives a read-out RF signal Srf outputted from the optical pickup 2 and applies predetermined demodulation process and decoding process to it. Then, the reproduction control unit 20 generates a reproduction signal to output it.

The servo control unit 30 receives the read-out RF signal Srf from the optical pickup 2, and based on it, supplies a servo signal S1 such as a tracking error signal and a focus signal to the optical pickup 2. At the same time, the servo control unit 30 supplies the spindle servo signal S2 to the spindle motor 3. Thereby, various kinds of servoprocesses such as the tracking servo, the focus servo and the spindle servo are executed.

The present invention mainly relates to a recording method in the recording control unit 10. Since various kinds of known methods are applicable to the reproduction control and the servo control, detailed explanations thereof are not given.

Additionally, though FIG. 9 shows the information recording and reproduction apparatus as an embodiment of the present invention, the present invention can be applied to an information recording apparatus dedicated to recording.

Figure 10:
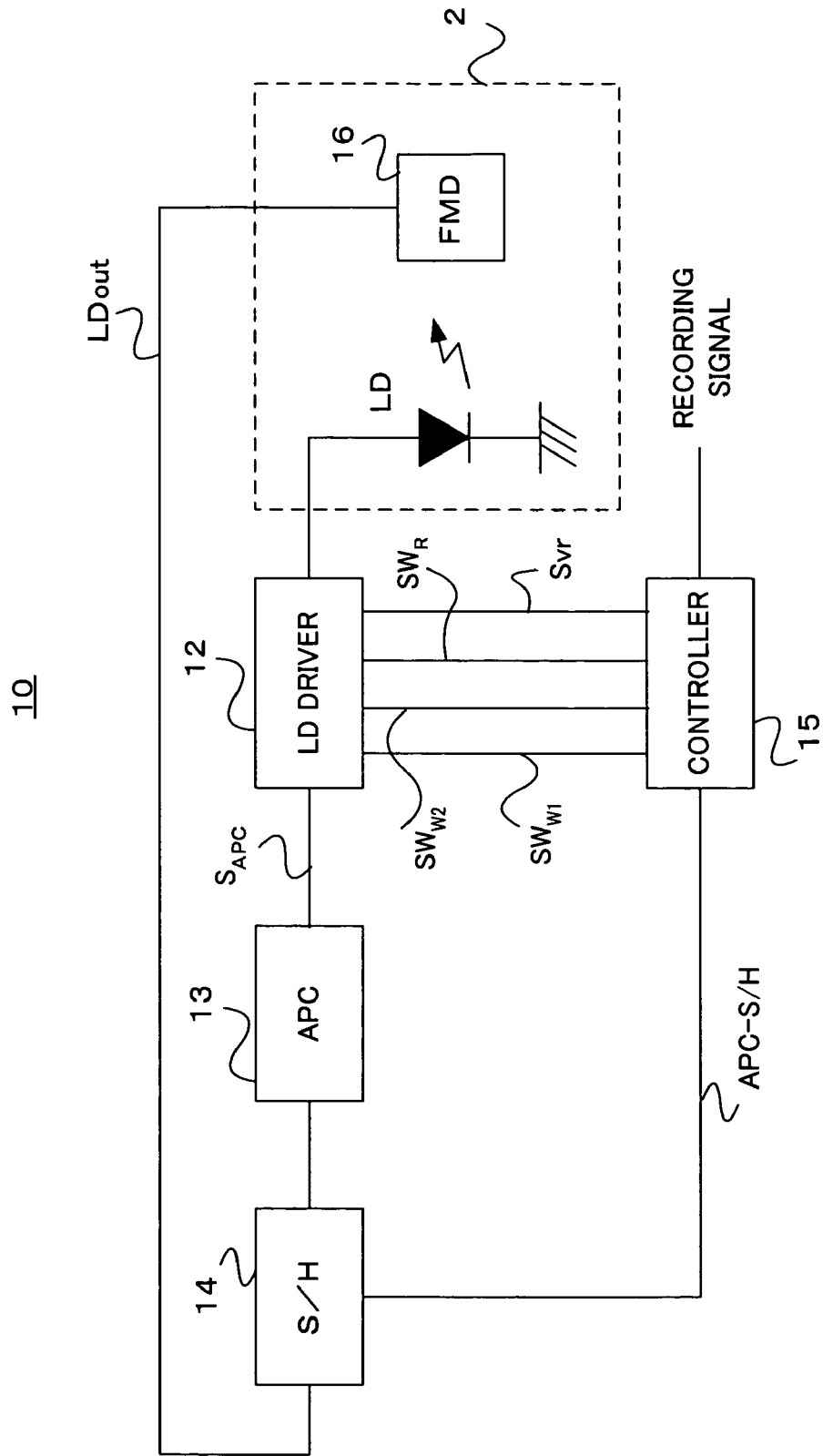
FIG. 10 is a block diagram showing a configuration of a recording control unit shown in FIG. 9.

FIG. 10 shows an inner configuration of the optical pickup 2 and the recording control unit 10. As shown in FIG. 10, the optical pickup 2 includes the laser diode LD for generating the recording beam for recording the information on the optical disc D and the reproduction beam for reproducing the information from the optical disc D, and a front monitor diode (FMD) 16 for receiving the laser light emitted from the laser diode LD and outputting a laser power level signal LDout corresponding to the laser light.

The optical pickup 2 further includes known components such as a photo detector for receiving a reflected beam by the optical disc D of the reproduction beam and generating the read-out RF signal Srf, and an optical system guiding the recording beam, the reproduction beam and the reflected beam in an appropriate direction. But illustrations and detailed explanations thereof are omitted.

Meanwhile, the recording control unit 10 includes a laser diode (LD) driver 12, an APC (Automatic Power Control) circuit 13, a sample-holding (S/H) circuit 14 and a controller 15.

The LD driver 12 supplies a current corresponding to the recording signal to the laser diode LD and records the information onto the optical disc D. The front monitor diode 16 is arranged in the vicinity of the laser diode LD in the optical pickup 2 and receives the laser light emitted from the laser diode LD to output the laser power level signal LDout showing a level thereof.

The sample-holding circuit 14 samples and holds the level of the laser power level signal LDout at a timing defined by a sample-holding signal APC-S/H. Based on the output signal of the sample-holding circuit 14, the APC circuit 13 executes the power control of the LD driver 12 so that the bias power level of the laser light emitted from the laser diode LD becomes constant.

The controller 15 mainly executes recording operation and APC operation. First, the recording operation will be explained. In the recording operation, the controller 15 generates switch signals $SW_R$, $SW_{W1}$ and $SW_{W2}$, controlling the current amount supplied to the laser diode LD, and a control signal Svr to supply them to the LD driver 12.

Figure 11:
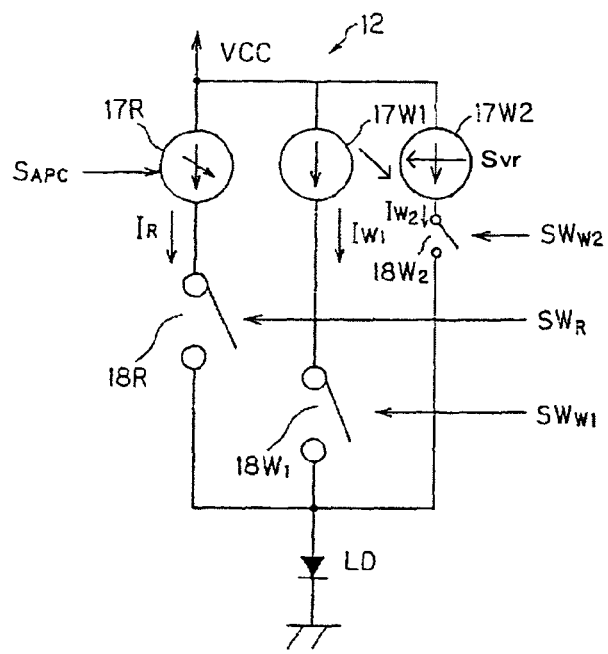
FIG. 11 is a block diagram showing a configuration of an LD driver shown in FIG. 10.

FIG. 11 shows the detailed configuration of the LD driver 12. As shown in FIG. 11, the LD driver 12 includes a current source 17R for the bias level, current sources 17W1 and 17W2 for the write level and switches 18R, 18W1 and 18W2.

The current source 17R for the bias level applies the driving current $I_R$ for emitting the laser light at the bias power Pb to the laser diode LD, and the driving current $I_R$ is supplied to the laser diode LD via the switch 18R. Therefore, when the switch 189R is in an ON state, the driving current $I_R$ of the bias power is supplied to the laser diode LD. When the switch 18R is in an OFF state, the supply of the driving current $I_R$ stops. The magnitude of the driving current $I_R$ from the current source 17R is varied by the control signal $S_{APC}$.

The current sources 17W1 and 17W2 for the write level apply driving currents $I_{W1}$ and $I_{W2}$ for emitting the laser light by the write power to the laser diode LD, respectively. The driving current $I_{W1}$ is supplied to the laser diode LD via the switch 18W1, and the driving current $I_{W2}$ is supplied to the laser diode LD via the switch 18W2.

In the write strategy according to the present invention, the write powers of two levels, i.e., the first write power (peak power) Po and the second write power (intermediate bias power) Pm lower than the first write power, are used (see FIG. 1). When the switch 18R is in the ON state and the switch 18W1 is further on the ON state, the sum driving current of the driving currents $I_R$ and $I_{W1}$ is supplied to the laser diode LD. Thereby, the laser diode is driven by the second write power Pm. In addition, when the switches 18R and 18W1 are on the ON states and the switch 18W2 is further the ON state, the driving current $I_{W2}$ is further supplied to the laser diode LD. As a result, the sum driving current of the driving currents $I_R$, $I_{W1}$ and $I_{W2}$ is applied to the laser diode, and the laser diode is driven by the first write power Po. When the switch 18W1 is on the OFF state, the supply of the driving current $I_{W1}$ stops.

When the switch 18W2 is on the OFF state, the supply of the driving current $I_{W2}$ stops. The control signal Svr is supplied to the current source 17W2 from the controller 15, and the current source 17W2 supplies the driving current $I_{W2}$ corresponding to the control signal Svr to the laser diode LD.

Figure 12:
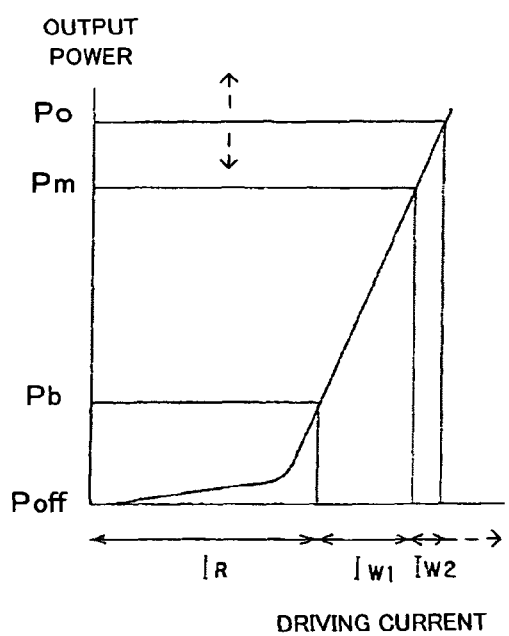
FIG. 12 is a graph showing a relation between a driving current and an output power of an LD.

FIG. 12 shows a relation between the driving current supplied to the laser diode LD and the output power of the laser light emitted from the laser diode LD. As understood from FIG. 12, when the driving current $I_R$ is supplied to the laser diode LD, the laser light is emitted by the bias power Pb. When the driving current $I_{W1}$ is further applied in the state, the laser light is emitted by the second write power Pm. When the driving current $I_{W2}$ is further applied, the laser light is emitted by the first write power Po.

At the time of recording of the information onto the optical disc, basically the driving current $I_R$ is always supplied and the laser light is emitted by the bias power Pb. Then, the driving currents $I_{W1}$ and $I_{W2}$ are further applied in correspondence to the recording pulse. Thereby, the first write power Po or the second write power Pm is applied, and the information is recorded onto the optical disc.

Additionally, in correspondence to the control signal Svr supplied from the controller 15, the first write power (peak power) Po is varied. As shown in FIG. 10, the controller 15 receives the recording signal and determines whether each of the recording data included in the recording signal is the short mark or the long mark. Then, the controller 15 supplies the control signal Svr to the current source 17W2 in correspondence with the result. Thereby, when the recording data is the long mark, the current source 17W2 is controlled so that the first write power Po becomes the constant peak power Pon. When the recording data is the short data, the current source 17W2 is controlled so that the first write power Po becomes the peak powers Po1 or Po2 different from the constant peak power Pon. Thereby, as shown in each of the above-mentioned embodiments, the recording powers of the short mark and the long mark can be made different. The determination of the short mark and the long mark by the controller 15 is different in each of the first to third embodiments, as described above.

Next, the APC operation will be explained. The APC operation adjusts the driving current level supplied to the laser diode LD from the LD driver 12 so that the level of the bias power of the laser light outputted by the laser diode LD becomes constant. More concretely, in the long space period (e.g., the space periods of 5T to 11T and 14T) of a space portion of the recording signal (which is 8-16-modulated and has the mark periods of 3T to 11T and 14T and the space period), the driving signal SD from the recording control unit 10 is adjusted so that the level of the bias power Pb becomes constant.

Concretely, the APC operation is executed as follows. As described above, the controller 15 generates the recording pulse corresponding to the recording signal and drives the LD driver 12 by the recording pulse to make the laser light emitted from the laser diode LD.

The front monitor diode 16, arranged in the vicinity of the laser diode LD in the optical pickup 2, receives the laser light emitted from the laser diode LD and generates the laser power level signal LDout showing the level to supply it to the sample-holding circuit 14.

The sample-holding circuit 14 samples the laser power level signal LDout supplied from the front monitor diode 16 at the timing given by the sample-holding signal APC-S/H inputted from the controller 15, and holds the level for a predetermined period. The sample-holding signal APC-S/H outputted from the controller 15 is a pulse showing a period (referred to as "APC period") in which the APC is executed.

Thus, the sample-holding circuit 14 holds the level of the laser power level signal LDout in the APC period in the space period of the recording signal to supply it to the APC circuit 13. The APC circuit 13 supplies the control signal $S_{APC}$ to the LD driver 12 so that the level of the laser power level signal LDout in the APC period becomes constant.

As shown in FIG. 11, the control signal $S_{APC}$ is inputted to the current source 17R for the bias level in the LD driver 12. Thereby, in correspondence to the control signal $S_{APC}$, the current $I_R$ applied from the current source 17R for the bias level varies. Namely, the APC is executed so that the bias power level obtained by the laser diode LD becomes constant.

Next, a description will be given of a recording condition determination process by the above information recording and reproduction apparatus. The recording condition determination process is executed before the actual information recording onto the recording medium, and it is particularly a process for determining the appropriate recording power in the present invention.

Figure 13:
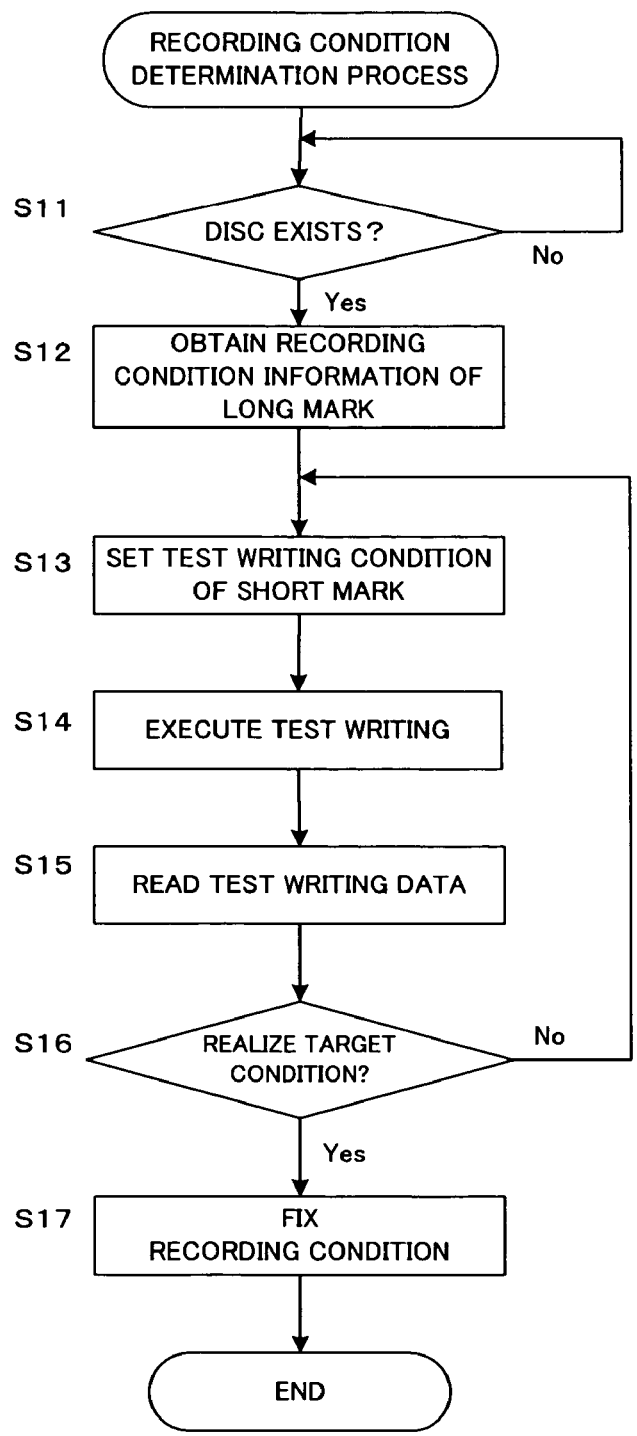
FIG. 13 is a flow chart of a recording condition determination process according to the embodiment.

FIG. 13 shows a flowchart of the recording condition determination process. The recording condition determination process can be basically realized if the controller 15 shown in FIG. 10 executes a program prepared in advance.

First, the controller 15 determines whether or not the disc exists in the information recording and reproduction apparatus (step S11). This is executed by such a known method that the laser light is emitted from the light source and the returned light is detected. Until the disc is inserted, the recording condition determination process does not proceed.

When the disc is detected (step S11; Yes), the controller 15 obtains the recording condition information of the long mark from an internal memory (not shown) (step S12). The recording condition information includes the recording power and the write strategy. In each of the above-mentioned embodiments, as described above, the recording power (the peak power Pon and the intermediate bias power Pmn) of the long mark is already determined, and the recording power is stored in the internal memory. Thus, the controller 15 reads it.

Next, the controller 15 performs the test writing for determining the recording condition of the short mark. Concretely, first, the test writing condition of the short mark is set (step S13). "Test writing condition of the short mark" includes the set range of the recording power of the short mark, i.e., the initial value, a variation range and a variation step of the recording power, and further includes the appropriate range of the asymmetry and the β value used as the parameter.

When the test writing condition is determined, the controller 15 performs the test writing (step S14). Concretely, the signals SWW1, SWW2, SWR and Svr are supplied to the LD driver 12 so that the test writing is performed with the initial value of the recording power, and the test writing is performed on the disc. Then, the controller 15 reads the data recorded by the test writing from the disc (step S15) and obtains the symmetry and the β value being the evaluation parameter from the RF signal to determine whether or not those values satisfy a target condition (step S16).

When the target condition is not satisfied (step S16; No), the process returns to step S13. Then, the recording power is varied, and steps S13 to S16 are executed. Meanwhile, when the target condition is satisfied (step S16; Yes), the recording condition including the recording power at this time is determined as the optimum recording condition of the short mark (step S17), and the process ends.

As described above, by the recording condition determination process, with varying the recording power of the short mark and evaluating the asymmetry and the β value, the recording power giving the appropriate asymmetry and/or the β value is determined.

Figure 14:
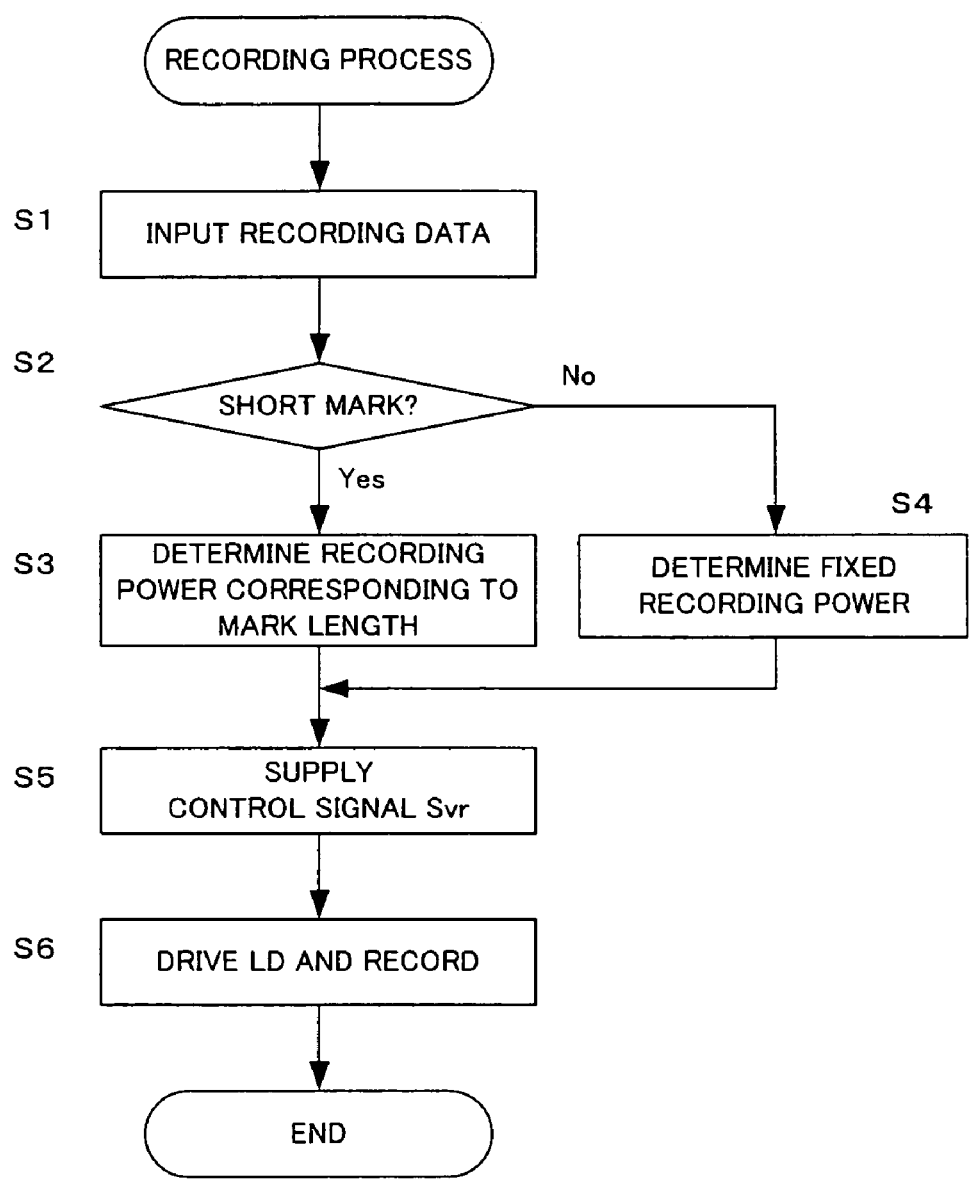
FIG. 14 is a flow chart of a recording process by the information recording and reproduction apparatus of the embodiment.

Next, a description will be given of a recording process by the above-mentioned information recording and reproduction apparatus. The recording process which will be described below is mainly executed when the controller 15 shown in FIG. 10 controls the LD driver 12 based on the recording signal supplied from the external. FIG. 14 shows a flow chart of the recording process. The controller 15 can execute the recording process by executing the program prepared in advance, corresponding to a process shown below.

First, when receiving the recording signal including plural recording data (step S1), the controller 15 determines whether each of the plural recording data included in the recording signal is the short mark or the long mark. As described above, the determination is different in the first to third embodiments. When determining that the recording data is the short mark (step S2; Yes), the controller 15 determines the recording power (i.e., the peak power and the intermediate bias power) corresponding to the mark length (step S3). For example, in the case of the first embodiment, the controller 15 determines the peak power as Po1 when the short mark is 3T, and the peak power as Po2 when the short mark is 4T. The recording power at this time is obtained by the above-mentioned recording condition determination process. Meanwhile, when determining that the recording data is the long mark (step S2; No), the controller 15 sets the recording power to the fixed value (step S4). Namely, the controller 15 determines the peak power and the intermediate bias power as the fixed values Pon and Pmn, respectively.

The controller 15 then supplies, to the LD driver 12, the control signal Svr corresponding to the recording power determined in step S3 or S4 (step S12). Based on the supplied control signal Svr, the LD driver 12 drives the laser diode LD and records the recording mark corresponding to the recording data onto the disc D (step S6). In this manner, the inputted recording signal is recorded onto the disc D.

Modification

In the above-mentioned embodiment, the test writing is executed with varying the recording power of the recording pulse waveform and the optimum recording power is obtained. Further, this technique may be combined to a technique of performing the test writing with varying a time width of the recording pulse waveform (i.e., varying the strategy). Varying the time width of the recording pulse waveform is performed as follows. First, the test writing is executed with varying the time widths of the top pulse 60 tp, the intermediate bias portion 60 m, and the last pulse 60 lp shown in FIG. 1. Then, the recording data is read, and thus the evaluation parameter such as a jitter is evaluated. Finally, the strategy with which the evaluation parameter satisfies a predetermined condition is determined as the optimum strategy.

A combination method with this embodiment is as follows. With varying the recording power by this embodiment, the test writing is executed. Then, the appropriate recording power of the short mark is determined. Afterwards, with varying the above-mentioned strategy, the test writing is executed. In this manner, the appropriate strategy may be determined. Afterwards, with varying the recording power by this embodiment again, the test writing may be executed, according to need. Thereby, both of the power of the recording pulse waveform and the time width can be optimized.

In the above embodiments, such examples that the present invention is applied to the DVD-R/RW and the DVD+R/RW are shown. However, the present invention is similarly applicable to a Blu-ray disc, an HD DVD and a DVD-RAM, too.

INDUSTRIAL APPLICABILITY

This invention can be used for the information recording apparatus, the information reproduction apparatus and the information recording and reproduction apparatus which record the information onto the recording medium such as the optical disc and/or reproduce the information from the recording medium by irradiating the laser light thereon.

The invention claimed is:

1. An information recording apparatus which irradiates a laser light onto a recording medium and forms a recording mark corresponding to a recording signal, comprising:
a light source which emits the laser light;
a signal generating unit which generates a recording pulse signal for driving the light source based on the recording signal; and
a test writing unit which drives the light source based on the recording pulse signal and executes test writing,
wherein the recording pulse signal includes a mark period for forming the recording mark and a space period for forming no recording mark,
wherein the test writing unit executes the test writing with making a recording power of a long mark constant and varying a recording power of a short mark,
wherein the short mark is a mark which does not have a level of largest magnitude, and the long mark is a mark which has a level of largest magnitude.

2. The information recording apparatus according to claim 1, wherein the recording power of the long mark is a recording power ensuring reproduction compatibility.

3. The information recording apparatus according to claim 2, wherein the recording power of the long mark is a recording power making a modulation degree within a predetermined range.

4. The information recording apparatus according to claim 1, wherein the short mark is a shortest mark and the long mark is a mark other than the short mark.

5. The information recording apparatus according to claim 1, wherein the short mark is a shortest mark and a second shortest mark, and the long mark is a mark other than the short mark.

6. An information recording method which irradiates a laser light onto a recording medium and forms a recording mark corresponding to a recording signal, comprising:
a signal generation process which generates a recording pulse signal for driving a light source based on the recording signal; and
a test writing process which drives the light source based on the recording pulse signal and executes test writing,
wherein the recording pulse signal includes a mark period for forming the recording mark and a space period for forming no recording mark,
wherein the test writing process executes test writing with making a recording power of a long mark constant and varying a recording power of a short mark,
wherein the short mark is a mark which does not have a level of largest magnitude, and the long mark is a mark which has a level of largest magnitude.

7. The information recording apparatus according to claim 1, wherein the recording power of the long mark is determined such that waveform distortion does not occur or the waveform distortion becomes equal to or smaller than a predetermined value, the waveform distortion indicating a ratio of distortion amount, with respect to magnitude, of an RF signal generated by reproducing recording marks recorded by the test writing.

* * * * *